United States Patent
Boe

(10) Patent No.: US 9,203,218 B2
(45) Date of Patent: Dec. 1, 2015

(54) SUBSEA ELECTRICAL POWER SYSTEM

(71) Applicant: Ove Boe, Tanem (NO)

(72) Inventor: Ove Boe, Tanem (NO)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 14/046,830

(22) Filed: Oct. 4, 2013

(65) Prior Publication Data

US 2014/0098468 A1   Apr. 10, 2014

(30) Foreign Application Priority Data

Oct. 5, 2012   (EP) .................................... 12187434

(51) Int. Cl.
*H02B 7/00* (2006.01)
*H02G 1/10* (2006.01)
*H02G 9/02* (2006.01)

(52) U.S. Cl.
CPC .. *H02B 7/00* (2013.01); *H02G 1/10* (2013.01); *H02G 9/02* (2013.01); *Y10T 29/49002* (2015.01)

(58) Field of Classification Search
CPC .............. H02G 1/10; H02G 9/02; H02B 7/00
USPC .......................... 174/31.5; 361/601
See application file for complete search history.

(56) References Cited

U.S. PATENT DOCUMENTS

| | | | |
|---|---|---|---|
| 5,280,766 A * | 1/1994 | Mohn | 166/368 |
| 5,876,872 A * | 3/1999 | Feezor | 429/118 |
| 6,059,539 A * | 5/2000 | Nyilas et al. | 417/228 |
| 6,873,063 B1 * | 3/2005 | Appleford et al. | 307/149 |
| 6,985,061 B2 * | 1/2006 | Hafskjold et al. | 336/90 |
| 7,952,855 B2 * | 5/2011 | Sletten et al. | 361/618 |
| 7,989,984 B2 * | 8/2011 | Draper et al. | 307/85 |
| 2005/0116799 A1 * | 6/2005 | Ostergaard | 335/132 |
| 2008/0271803 A1 | 11/2008 | Corren et al. | |
| 2009/0200035 A1 * | 8/2009 | Bjerkreim et al. | 166/335 |
| 2013/0286550 A1 * | 10/2013 | Hazel et al. | 361/673 |

FOREIGN PATENT DOCUMENTS

GB   532067   1/1941

OTHER PUBLICATIONS

European Search Report dated Apr. 17, 2013 for corresponding European Patent Application No. EP 12187434.1-1555.

* cited by examiner

*Primary Examiner* — William H Mayo, III
*Assistant Examiner* — Hiram E Gonzalez
(74) *Attorney, Agent, or Firm* — Lempia Summerfield Katz LLC

(57) ABSTRACT

A subsea electrical power system is provided. The subsea electrical power system includes a first subsea electric device having a first subsea enclosure and a second subsea electric device having a second subsea enclosure. The first subsea electric device and the second subsea electric device are mounted on a common frame. A duct is provided between the first subsea enclosure and the second subsea enclosure.

16 Claims, 2 Drawing Sheets

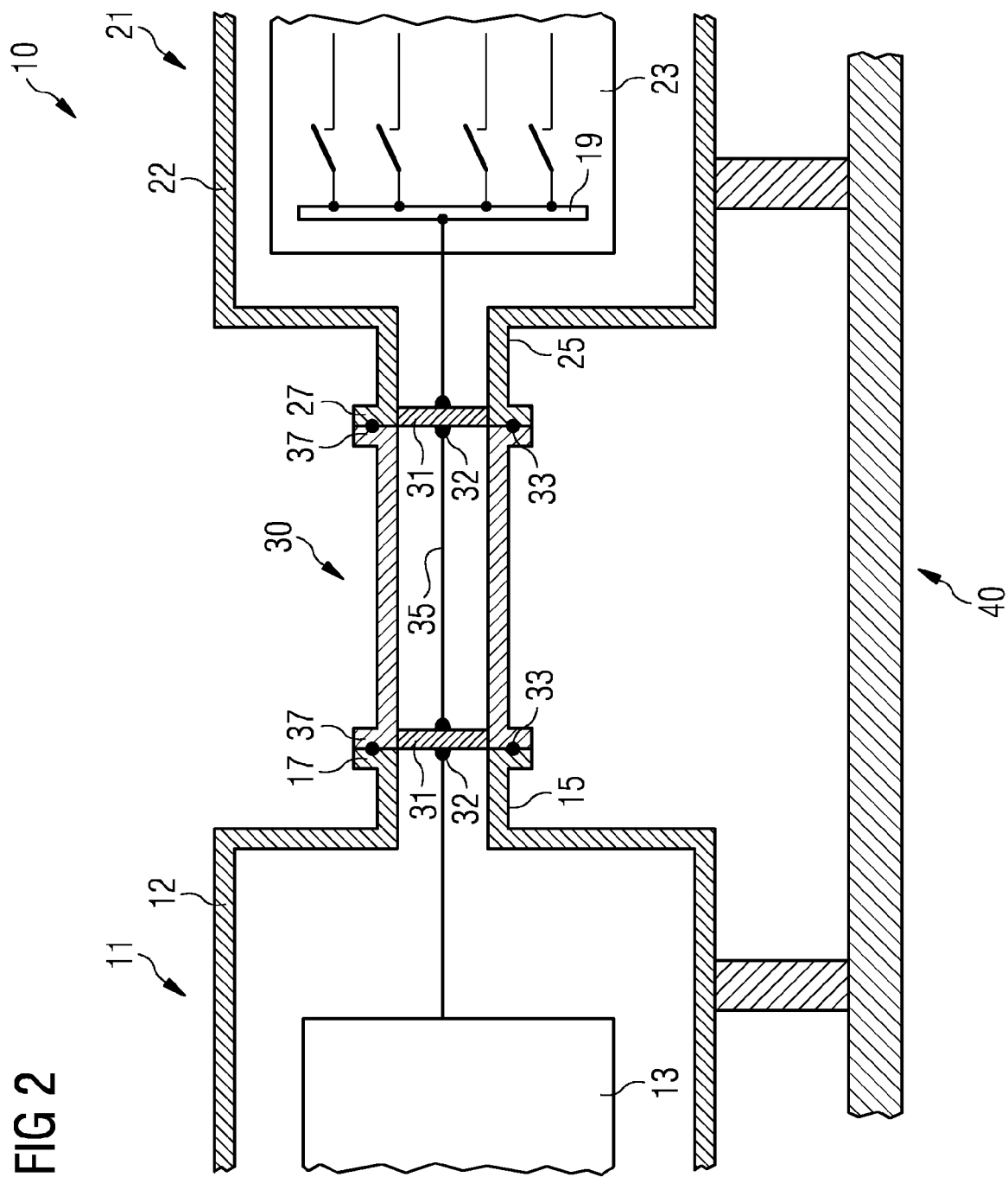

SUBSEA ELECTRICAL POWER SYSTEM

This application claims the benefit of EP 12187434.1, filed on Oct. 5, 2012, which is hereby incorporated by reference in its entirety.

FIELD

The present embodiments relate to a subsea electrical power system including a first and a second subsea electrical device, and to a method of providing a subsea electrical power system.

BACKGROUND

Due to the increasing energy demands, offshore oil and gas production is moving into deeper waters. For providing an efficient and secure production, processing facilities are being installed at the ocean floor. Such subsea installations may include a range of components including pumps, compressors and the like, as well as a power grid for operating the components. The power grid may, for example, include a subsea transformer, subsea switchgear and subsea variable speed drives. The components of the subsea installation are to be protected from the surrounding sea water, in which pressures of 300 bar or more may prevail (e.g., at installation depths of 3,000 m or more).

Two solutions were proposed for dealing with these high pressures. A pressure resistant enclosure may be provided. The pressure resistant enclosure has a close to atmospheric internal pressure, enabling the use of conventional electric and mechanical components. Such enclosures are to have relatively thick walls and are thus bulky and heavy, since the enclosures are to withstand the high pressure difference.

Another solution is the use of pressurized (or pressure compensated) enclosures that include a volume/pressure compensator that balances the pressure inside the enclosure to the pressure prevailing in the ambient sea water. The pressurized enclosure may be filled with a liquid, and components operated inside the pressurized enclosure are operable in such liquid under high pressures. The pressure/volume compensator compensates for variations in the volume of the liquid filling the enclosure, which may occur due to variations in outside pressure and/or temperature.

When providing a subsea power grid including several subsea electric devices, such as the above mentioned subsea transformer, subsea switchgear and the like, the devices are to be connected electrically. Solutions exist both for pressure resistant and pressure compensated enclosures. The subsea electric devices may be connected by jumper cables. At the device, a subsea connector provides an electric connection between the interior of the device and the cable. For this purpose, dry mate and wet mate connectors are known. The design of both types of connectors is a technical challenge. A wet mate connector with flushing arrangements has an even higher complexity than a dry mate connector. Both types of connectors are to withstand the high subsea pressures, yet the connectors are to remain compact, which is a particular challenge for medium and high voltage applications. For example, for high voltage and high current ratings that may be necessary for, for example, the connection between a transformer and a distribution system, a reliable design of such connectors is very difficult and costly. The connectors (e.g., wet mate connectors) may thus represent a sensitive component that may be considered a weak link in respect of reliability.

SUMMARY AND DESCRIPTION

It is desirable to make the connection between subsea electric devices more reliable to, for example, reduce the complexity of such connection. Also, it is desirable to reduce costs involved in providing such connection.

The scope of the present invention is defined solely by the appended claims and is not affected to any degree by the statements within this summary.

The present embodiments may obviate one or more of the drawbacks or limitations in the related art. For example, an improved electric connection between two subsea electric devices is provided.

An embodiment provides a subsea electrical power system including a first subsea electric device (e.g., a subsea transformer) that includes a first subsea enclosure configured to enable deployment of the first subsea electric device at a subsea location. The subsea electrical power system includes a second subsea electric device (e.g., a subsea power distribution unit or a subsea switchgear) that includes a second subsea enclosure configured to enable deployment of the second subsea electric device at a subsea location. The subsea electric power system also includes a common frame. The first subsea electric device and the second subsea electric device are mounted to the common frame. A duct between the first subsea enclosure and the second subsea enclosure is also provided. The duct is sealed to the first subsea enclosure and to the second subsea enclosure. The subsea electrical power system also includes at least one electric connection between the first subsea electric device and the second subsea electric device. The electric connection reaches from inside the first subsea enclosure through the duct to inside the second subsea enclosure.

In such subsea electrical power system, an electric connection may be established between the first subsea electric device and the second subsea electric device without requiring any connectors, such as dry mate or wet mate connectors. The electric connection may effectively be protected against an ambient medium, such as seawater, when the subsea electrical power system is installed subsea. This is achieved by sealing the duct to the first and to the second subsea enclosure. This way, ingress of surrounding seawater may be prevented when the subsea electrical power system is installed subsea. A liquid tight connection between the duct and the first or second subsea enclosure may be established in a relatively simple way, resulting in a considerable cost reduction compared to conventional connection techniques.

In an embodiment, the first subsea enclosure, the second subsea enclosure and the duct are pressure balanced against an ambient medium (e.g., against ambient sea water when the subsea electrical power system is installed subsea). Accordingly, the duct, the first subsea enclosure and the second subsea enclosure may have relatively thin walls compared to pressure resistant enclosures. Differential pressure between the inside of the duct and either one of the enclosures and the ambient medium may be kept low. Similarly, the differential pressure between the inside of the duct and the inside of the first or second subsea enclosure may be kept small. The first subsea enclosure, the second subsea enclosure, the duct, or a combination thereof may include a pressure compensator. In accordance with whether an exchange of fluid between the inside of the first or second subsea enclosure in the inside of the duct is allowed, a pressure compensator may be provided for one, for two or for all three of these components. A pressure compensator may also be arranged to compensate pressure differences between the inside of the duct and the inside the first subsea enclosure or the second subsea enclosure.

The first subsea enclosure, the second subsea enclosure and the duct may be filled with a dielectric liquid. For example, transformer oil or silicon oil or the like may be used as a dielectric liquid. The liquid may both provide electrical insulation and conduct the heat away from components inside the first and second subsea enclosures and the duct. Also, since the volume change of such liquid with pressure is relatively low, a compensation volume provided for pressure compensation may be kept relatively small.

In an embodiment, the connection between the duct and the first and/or second subsea enclosure may be configured so as to enable a fluid communication between the inside of the duct and the inside of the first or second subsea enclosure, respectively. If the fluid (e.g., the dielectric liquid) is allowed to flow between one of the subsea enclosures and the duct, only one pressure compensator may be used for these two components. If the liquid is allowed to flow between all three components, only a single pressure compensator may be used.

In an embodiment, the connection between the duct and the first and/or second subsea enclosure may include a substantially liquid tight barrier preventing a flow of liquid between the inside of the duct and the first or second subsea enclosure, respectively. Such liquid tight barrier may, for example, prevent dirt or contaminated dielectric liquid to flow between the two subsea enclosures. Such type of contamination may, for example, be created upon occurrence of an electric discharge or the like. Also, should ambient medium, such as sea water, leak into one of the enclosures, the ambient medium would be prevented from reaching the other enclosure.

Combination of the above features may be provided. In some embodiments, a liquid tight barrier may, for example, be provided at one end of the duct, where a fluid communication may be enabled at the other side of the duct. By having a barrier only on one side of the duct, the number of pressure compensators may be reduced, while, at the same time, a transfer of contaminated dielectric liquid or seawater may be prevented between one subsea enclosure and the other subsea enclosure.

In an embodiment, the connection between the duct and the first and/or second subsea enclosure may include a flange on the duct and a flange on the respective subsea enclosure. The flange on the duct may be mechanically mounted to the flange on the respective subsea enclosure to provide a flange connection. The duct may thus be mounted to the respective subsea enclosure in a mechanically relatively simple way. An efficient sealing may be achieved. The seal between the duct and the subsea enclosure may be provided by the flange. The flange connection may, for example, include a seal or a gasket (e.g., a metal gasket or a rubber gasket or the like). The flange connection may include two seals to provide a double barrier.

In an embodiment, the duct may be welded to the first and/or to the second subsea enclosure. A highly reliable and mechanically strong connection may thus be achieved between the duct and the respective subsea enclosure. Such welded connection may be highly reliable, for example, with respect to the ingress of sea water.

The above features may be combined. As an example, the duct may at one end be welded to a subsea enclosure and may at another end be provided with a flange for mounting to a corresponding flange on the other subsea enclosure. In such configuration, mounting may be facilitated, and the reliability may be further increased, while the system remains flexible enough.

In an embodiment, the connection between the duct and the first and/or second subsea enclosure includes bushings for providing the electric connection from inside the first subsea enclosure through the duct to inside the second subsea enclosure. Accordingly, if a barrier is provided internally between one of the subsea enclosures and the duct, the electric connections may be fed through this barrier by the bushing. The internal barrier remains liquid tight, so that no contaminated dielectric liquid may pass from one subsea enclosure to the other. The bushing may be a medium or high voltage bushing.

In an embodiment, the electric connection includes a cable, a bus bar, or a combination thereof.

As an example, the electric connection may include a bus bar reaching from inside the first subsea enclosure through the duct to the inside of the second subsea enclosure. In another example, the electric connection may include a cable reaching from inside the first subsea enclosure through the duct to the inside of the second subsea enclosure. The bus bar or the cable may, for example, at one side be connected to the output of a subsea transformer being located in the first subsea enclosure, and the other side of the bus bar or cable may be connected to the bus bar of a switchgear located in the second subsea enclosure. In other embodiments, the bus bar of the switch gear may provide the electric connection through the duct.

In an embodiment, the electric connection may be configured to transmit a voltage of at least 1 kV (e.g., at least 4 kV). The voltage may lie within the range of about 1 kV to about 50 kV. As an example, the electric connection may, for example, be configured for a voltage of 6 kV or 6.6 kV or the like. The electric connection may be configured to transmit electric power of at least 1 MVA (e.g., at least 2 MVA). Several pumps, compressors or the like may be operated for subsea processing or injection with electric power received via the second subsea electric device (e.g., a subsea switchgear).

If an internal barrier is provided that blocks the passage through the duct, the cable may pass such internal barrier by the above mentioned bushings.

The duct may, for example, be made from metal (e.g., from steel). Other materials may also be used (e.g., since the other materials would only have to withstand relatively low differential pressures when the inside of the duct is pressure compensated).

The duct may at least partially be flexible. This may allow for the misalignment of the first and second subsea electric devices to a certain degree, and may also prevent mechanical fatigue of the duct or the respective mechanical connections to the first and second subsea enclosures in case of vibrations or the like.

As an example, the duct may include a bellow portion for providing a flexible portion of the duct. Such bellow portion may again be made from metal (e.g., steel), or the bellow portion may be made form another material.

The duct may also be angled at one or more positions. Such configuration may also achieve flexibility to a certain degree, so that a certain misalignment of the first and second subsea electric devices may be allowed, and the transmission of vibrations and mechanical fatigue may be prevented or at least mitigated.

The first and the second subsea enclosures may be separate enclosures. The first and the second subsea enclosures may not have a common wall. Each enclosure may itself be surrounded by ambient medium when deployed at the subsea location. The first and the second subsea enclosures may be spaced apart when mounted on the common frame (e.g., there may be a spacing between the first and the second subsea enclosures). By having two separate subsea enclosures, the flexibility of the system may be increased, and available subsea devices, such as a subsea transformer or subsea switchgear, may be employed in the subsea electrical power system.

A further embodiment provides a method of providing a subsea electrical power system. The method includes mounting a first subsea electric device including a first subsea enclosure, and a second subsea electric device including a second subsea enclosure on a common frame. The method also includes providing a duct between the first subsea enclosure and the second subsea enclosure, and sealing the duct to the first subsea enclosure and to the second subsea enclosure. The method includes providing an electric connection between the first and the second subsea electric devices. The electric connection is provided from inside the first subsea enclosure through the duct to inside the second subsea enclosure. With such method, advantages similar to the advantages outlined above with respect to the subsea electrical power system may be achieved.

In an embodiment, the method may also include deploying the common frame with the first subsea electric device and the second subsea device at a subsea location. Deployment may be facilitated, since both devices may be deployed simultaneously, and no electric connection needs to be established after deployment (e.g., by complex wet mateable connectors that are to be operated by remotely operated vehicles (ROVs).

In other embodiments, the method may also include providing the subsea electrical power system in accordance with any of the above outlined configurations.

The features of the embodiments mentioned above and those yet to be explained below may be combined with each other unless noted to the contrary.

BRIEF DESCRIPTION OF THE DRAWINGS

In the drawings, like reference numerals refer to like elements.

FIG. 2 is a schematic representation showing a sectional side view of one embodiment of the subsea electrical power system, the duct being shown in more detail.

DETAILED DESCRIPTION

Figure 1:
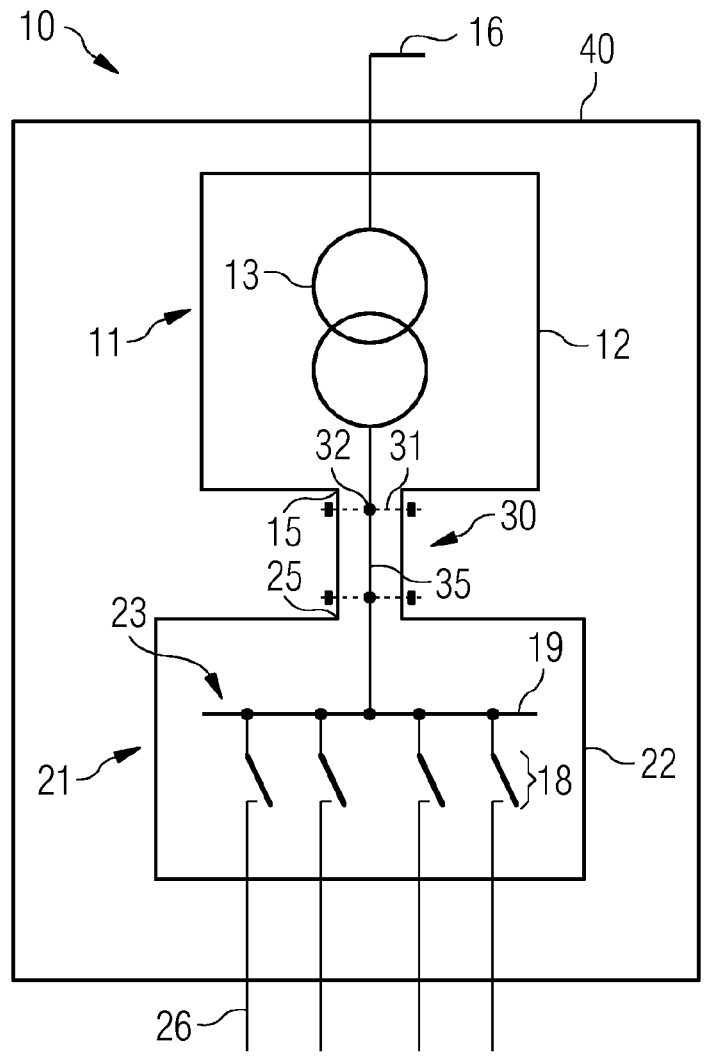
FIG. 1 is a schematic representation showing one embodiment of a subsea electrical power system.

In the following, the embodiments illustrated in the accompanying drawings are described in more detail. The following description is only illustrative and non-restrictive. The drawings are only schematic representations, and elements in the drawings are not necessarily to scale with each other.

FIG. 1 shows one embodiment of a subsea electrical power system 10 that includes a first subsea electric device 11 and a second subsea electric device 21. In the examples described hereinafter, the first subsea electric device 11 is assumed to be a subsea transformer, and the second subsea electric device 21 is assumed to be a subsea switchgear. These are only examples, and other types of subsea electric devices may be used.

The subsea transformer 11 includes a first subsea enclosure 12 and a transformer 13. The subsea switchgear 21 includes a second subsea enclosure 22 and switchgear 23. The subsea transformer 11 and the subsea switchgear 21 are both mounted to a same common frame 40 that may, for example, be a subsea skid that may be a construction of metal beams or the like.

As illustrated in FIG. 1, the first and second subsea enclosures 12, 22 are mounted to the frame 40 and are spaced apart by a certain distance. The first and second subsea enclosures 12, 22 are mechanically mounted to the frame 40 using brackets, clamps, bolts or the like. The subsea transformer 11 has an electric connection 16 via which the subsea transformer 11 receives electric power, for example from a topside installation on a fixed or floating platform, or from an onshore site. The electric connection 16 may, for example, be provided by an umbilical or a subsea cable. Further elements may be connected between the subsea transformer 11 and the power source (e.g., an umbilical termination unit or the like).

The subsea switchgear 21 distributes electric power to several consumers (e.g., subsea pumps, subsea compressors or the like). For this purpose, the subsea switchgear 21 has a bus bar 19 that is electrically coupled to the subsea transformer 11. Using the bus bar 19, the electric power is distributed to the electric loads or consumers. The switchgear 23 further includes switches or circuit breakers 18 that may be used to switch individual consumers on or off, or to break a short circuit current or the like. Electric connections 26 towards the consumers may be provided by subsea cables (e.g., by jumper cables connected to the subsea switchgear 21).

As shown, since several consumers are powered from the subsea switchgear 21, a relatively high electric power may be transferred from the subsea transformer 11 to the bus bar 19 of the switchgear 23. Transporting such high powers at relatively high voltage poses serious design challenges on electric connectors that are suitable for being used subsea.

To prevent problems associated with such connectors, the subsea electrical power system 10 includes a duct 30 that is mounted at one end to the first subsea enclosure 12 and at the other end to the second subsea enclosure 22. A fluid tight seal is provided between the duct 30 and each of the first and second subsea enclosures 12, 22. The subsea enclosure 12 has a connection portion 15 (e.g., a port or opening), and the subsea enclosure 22 has a connection portion 25 (e.g., a port or an opening), towards which the duct 30 is mounted. An electric connection 35 is provided from inside the first subsea enclosure 12 through the duct 30 to the inside of the second subsea enclosure 22. Using the duct 30, the transformer 13 may thus be connected electrically to the switchgear 23. The electric connection does not need to pass through an ambient medium surrounding the subsea electrical power system 10. An electric connection between the subsea transformer 12 and the subsea switchgear 21 may thus be established without requiring any wet mate or dry mate connectors. The limitations imposed by such types of connectors on the power and voltage that may be transmitted do accordingly not apply to the electric connection 35. Rather, high electric power at high voltage may be transmitted via the electric connection 35.

In the embodiment of FIG. 1, the first subsea enclosure 12, the duct 30 and the second subsea enclosure 22 are pressure compensated. This provides that the pressure inside these enclosures is substantially balanced or equalized to the pressure prevailing in the ambient medium surrounding the subsea electrical power system 10. The pressure compensation may be configured to create a slight overpressure inside the respective subsea enclosure or the duct 30, so as to prevent the ingress of ambient medium (e.g., surrounding seawater) in case a leak occurs.

For providing pressure compensation, a pressure compensator may be provided for and mounted to the first subsea enclosure 12, the duct 30 and/or the second subsea enclosure 22. All three components 12, 30 and 22 are filled with a dielectric liquid. Besides providing electrical insulation and cooling, the dielectric liquid experiences only relatively small volume changes when the absolute pressure and the temperature are changing. Accordingly, the change in volume that is to be compensated by the pressure compensators may be kept relatively small.

The duct 30 and the connection portions 15 and 25 may be configured in various ways. In some embodiments, a fluid passage may be provided between the inside of the duct 30 and the inside of the first and/or second subsea enclosure 12, 22. Providing such fluid passage has the advantage that dielectric liquid may flow between the inside of the duct 30 and the inside of the respective subsea enclosure, so that both the duct 30 and the respective subsea enclosure may be pressure compensated by a single pressure compensator. If a passage is provided between the interior of duct 30 and both subsea enclosures 12, 22, only a single pressure compensator may be provided for balancing the pressure inside all three components 12, 30 and 20.

In other embodiments, a liquid tight internal barrier 31 that prevents the flow of dielectric liquid between the interior of the duct 30 and the inside of one or both of the subsea enclosures 12 and 22 may be provided. Two of such internal barriers are indicated in FIG. 1 with the dotted lines. Providing such internal barrier has the advantage that dielectric liquid may not flow between the inside of one of the subsea enclosures 12, 22 and the inside of the duct 30, so that if a contamination of the dielectric liquid occurs (e.g., due to an electric arcing or the like), such contaminated dielectric liquid may not reach the interior of the duct 30 and the other subsea enclosure. Another advantage may be that the respective subsea enclosure 12 or 22 may be filled with dielectric liquid and may be closed by the internal barrier 31, so that the respective component may be preassembled before mounting the duct 30 and the other component.

To provide the electric connection 35 through the internal barrier 31, a bushing 32 may be provided in the internal barrier 31. Depending on the voltage that is to be transmitted, this may, for example, be a high voltage bushing. Using the bushing 32, the electric connection 35 may be established through the internal barrier 31 while maintaining a liquid tight seal by the barrier 31. Since both the inside of the duct 30 and the inside of subsea enclosure 12 or 22 is pressure compensated, there will only by a relatively small or even no pressure difference across the internal barrier 31. Consequently, there are only low demands on the pressure resistivity of the internal barrier 31 and of the bushing 32. A liquid tight seal may thus be achieved.

In embodiments, in which a liquid passage is provided between the inside of duct 30 and the inside of one of the subsea enclosures 12, 22, an internal barrier 31 and a bushing 32 may also be provided. The internal barrier 31 may include the fluid passage (e.g., in form of an opening or the like). The flow of dielectric liquid through the duct 30 may thus be restricted, while still providing a possibility of pressure compensation and providing mechanical support for the electric connection 35. In other embodiments, the barrier 31 has a liquid tight seal and may include a pressure compensator for equalizing pressure between the inside of the duct and the inside of the first and/or second subsea enclosure.

FIG. 2 is a diagram showing schematically an implementation of the subsea electrical power system 10 of FIG. 1. The explanations given further above with respect to FIG. 1 thus apply accordingly to the subsea electrical power system 10 of FIG. 2. In FIG. 2, a sectional side view is shown. The sectional side view focuses on the duct 30, and only part of the first subsea electric device 11 and the second subsea electric device 21 are shown in FIG. 2. As shown, both the first subsea electric device 11 with the subsea enclosure 12 and the second subsea electric device 21 with the subsea enclosure 22 are supported on the common frame 40.

In the example illustrated in FIG. 2, the connection portion 15 of the first subsea enclosure 12 includes a flange 17. Correspondingly, the connection portion 25 of the second subsea enclosure 22 includes a flange 27. Similarly, the duct 30 is provided with flanges 37 on each end thereof. Using the flanges 17, 37 and 27, flange connections are established between the duct 30 and the first and second subsea enclosures 12, 22. The flange connections may include one or more sealing elements. In the example of FIG. 2, a gasket 33 that may be a rubber gasket or a metal gasket is schematically indicated. Further sealing elements may be provided (e.g., for establishing a double barrier against the ambient sea water).

The flange connection illustrated in FIG. 2 is only one possibility of mechanically mounting the duct 32 to one of the subsea enclosures 12, 22. In other embodiments, a welded connection may, for example, be provided (e.g., the duct 30 may be welded onto one of the subsea enclosures 12, 22). A very leak proof sealing that does not require a double barrier may be provided by welding. In some embodiments, one end of the duct 30 may, for example, be welded to one of the subsea enclosures 12 or 22, while the other end of duct 30 may be connected with a flange connection to the other subsea enclosure.

In the example of FIG. 2, two internal liquid tight barriers 31 are shown, with respective bushings 32 providing an electric connection through these internal barriers 31. As shown, the internal barrier 31 may be located either in the connection portion 15 or 25 of the subsea enclosure 12 or 22, respectively, or the internal barrier 31 may be located at an end of the duct 30. The location of the internal barrier 31 is chosen in dependence on the particular application (e.g., in accordance with the sealing off one of the enclosures or the duct before assembly or the like). Only one internal barrier 31 may be provided in other embodiments, or no internal barrier 31 may be provided at all. Also, some embodiments may include an internal barrier 31 having a fluid passage or pressure compensator.

FIG. 2 also shows the electric connection 35 reaching from the first electric device 13 (e.g., the transformer) to the second electric device 23 (e.g., the switchgear). The electric connection 35 may be provided by one or more cables, and the cable may be continuous or may be interrupted by the bushings 32. In another embodiment, a section of the electric connection 35 or the whole electric connection 35 may be provided by a bus bar. The bus bar may extend from one of the subsea enclosures 12, 22 to the inside of the duct 30. Alternatively, the bus bar may extend all the way through the duct 30 into the other subsea enclosure. In some embodiments, such bus bar may be connected to the bus bar 19 of switchgear 23, or the bus bar 19 may extend into the duct 30 and possibly into the first subsea enclosure 12. Accordingly, the number of electric connection points may be reduced, and power distribution may be made more efficient.

The explanations given above are equally applicable to the subsea electrical power system 10 shown in FIG. 1.

Figure 3:
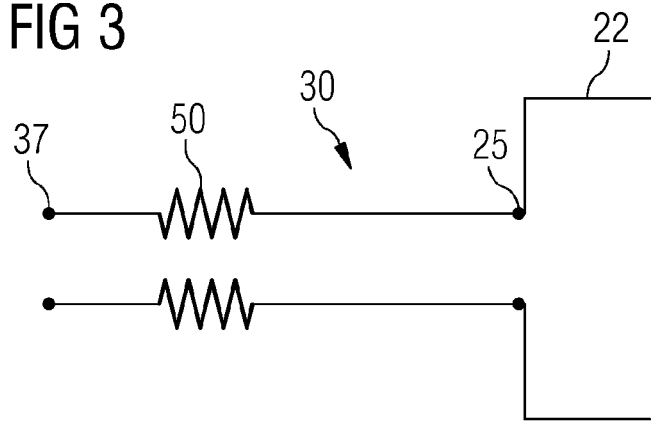
FIG. 3 is a schematic representation showing one embodiment of a duct that includes a flexible portion.

In FIGS. 1 and 2, the duct 30 is shown as a straight duct (e.g., formed by some type of cylindrical steel pipe or the like). This is only one possible configuration of the duct 30, and in other configurations, the duct 30 may have a more complex shape. The duct 30 may include curved portions and flexible portions, may have a rectangular cross section or the like. One example is illustrated in FIG. 3, where the duct 30 includes a bellow portion 50. The bellow portion 50 may be made of the same material as the remaining portions of duct 30 (e.g., steel). Alternatively, the bellow portion 50 may also be made of a different material. Using the bellow portion 50, the duct 30 is made flexible. A misalignment of the first and the second subsea enclosures 12, 22 may thus be compensated. The bellow portion 30 provides flexibility both in longitudinal direction (e.g., if the subsea enclosures 11, 12 are spaced too far apart or too closely), and the bellow portion 30 also provides flexibility in radial direction (e.g., for compensating a horizontal or vertical misalignment of the first and second subsea enclosures 12, 22). In the example of FIG. 3, one end of duct 30 is provided with the flange 37, while at the connection portion 25, the duct 30 is welded to the enclosure 22. As mentioned above, other configurations may also be provided.

Besides using a bellow portion 50, flexibility may also be achieved by introducing angles into the duct 30, or by using a material more flexible than steel for the duct 30. Besides handling misalignment of the subsea enclosures 12, 22, the transmission of vibrations between the first and second subsea electric devices may also be reduced, and mechanical fatigue of the duct 30 and of the connections to the respective subsea enclosures may be mitigated or even prevented.

As shown from the above description, using the duct 30, a reliable electric connection between the first and second subsea electric device 11, 22 may be provided. The connection is less complex than existing solutions. The weak and limiting component in the connection of the two subsea electric devices may thus be essentially eliminated. The reliability of subsea power distribution may be increased. Due to the limitations of existing dry mate and wet mate connectors, the proposed solution may provide an electric connection for considerably higher levels of electric power. Also, since the system may be assembled on a common frame, installation of the subsea electrical power system 10 at a subsea location may be facilitated. Although this may result an increase of size compared to individual subsea electric devices, the weight may be kept relatively low when the first and second subsea enclosures and the duct are pressure compensated against the ambient sea water.

Features of the above outlined embodiments may be combined with each other. The skilled person will appreciate that the above described embodiments are only examples given for the purpose of illustration, and that modifications may be made without departing from the scope of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A subsea electrical power system comprising:
a first subsea electric device comprising a first subsea enclosure that is configured to enable deployment of the first subsea electric device at a first subsea location;
a second subsea electric device comprising a second subsea enclosure that is configured to enable deployment of the second subsea electric device at a second subsea location;
a common frame, wherein the first subsea electric device and the second subsea electric device are mounted to the common frame;
a duct between the first subsea enclosure and the second subsea enclosure, the duct being sealed to the first subsea enclosure and to the second subsea enclosure; and
at least one electric connection between the first subsea electric device and the second subsea electric device, the at least one electric connection reaching from inside the first subsea enclosure through the duct to inside the second subsea enclosure, wherein the at least one electric connection is configured to transfer power between the first subsea electric device and the second subsea electric device,
wherein a connection between the duct and the first subsea enclosure, the second subsea enclosure, or the first subsea enclosure and the second subsea enclosure comprises a liquid tight barrier preventing a flow of liquid between an inside of the duct and the first subsea enclosure, the second subsea enclosure, or the first subsea enclosure and the second subsea enclosure, respectively.

2. The subsea electrical power system of claim 1, wherein the first subsea enclosure, the second subsea enclosure and the duct are pressure balanced against an ambient medium.

3. The subsea electrical power system of claim 2, wherein the first subsea enclosure, the second subsea enclosure, the duct, or a combination thereof comprises a pressure compensator.

4. The subsea electrical power system of claim 1, wherein the first subsea enclosure, the second subsea enclosure, the duct, or a combination thereof comprises a pressure compensator.

5. The subsea electrical power system of claim 1, wherein a connection between the duct and the first subsea enclosure, the second subsea enclosure, or the first subsea enclosure and the second subsea enclosure comprises a flange on the duct and a flange on the respective subsea enclosure of the first subsea enclosure and the second subsea enclosure, the flange on the duct being mechanically mounted to the flange on the respective subsea enclosure to provide a flange connection.

6. The subsea electrical power system of claim 1, wherein the duct is welded to the first subsea enclosure, the second subsea enclosure, or the first subsea enclosure and the second subsea enclosure.

7. The subsea electrical power system of claim 1, wherein a connection between the duct and the first subsea enclosure, the second subsea enclosure, or the first subsea enclosure and the second subsea enclosure comprises bushings for providing the at least one electric connection from inside the first subsea enclosure through the duct to inside the second subsea enclosure.

8. The subsea electrical power system of claim 1, wherein the at least one electric connection comprises a cable, a bus bar, or the cable and the bus bar.

9. The subsea electrical power system of claim 1, wherein the at least one electric connection comprises a bus bar or a cable reaching from inside the first subsea enclosure through the duct to an inside of the second subsea enclosure.

10. The subsea electrical power system of claim 1, wherein the duct is made from a metal.

11. The subsea electrical power system of claim 10, wherein the metal is steel.

12. The subsea electrical power system of claim 1, wherein the duct is at least partially flexible.

13. The subsea electrical power system of claim 1, wherein the duct comprises a bellow portion for providing a flexible portion of the duct.

14. The subsea electrical power system of claim 1, wherein the first subsea electric device comprises a subsea transformer.

15. The subsea electrical power system of claim 1, wherein the second subsea electric device comprises a subsea power distribution unit or a subsea switchgear.

16. A method of providing a subsea electrical power system comprising:

mounting a first subsea electric device comprising a first subsea enclosure and a second subsea electric device comprising a second subsea enclosure on a common frame;

providing a duct between the first subsea enclosure and the second subsea enclosure;

sealing the duct to the first subsea enclosure and to the second subsea enclosure; and providing an electric connection between the first subsea electric device and the second subsea electric device, the electric connection being provided from inside the first subsea enclosure through the duct to inside the second subsea enclosure, wherein the electric connection is configured to transfer power between the first subsea electric device and the second subsea electric device, wherein a connection between the duct and the first subsea enclosure, the second subsea enclosure, or the first subsea enclosure and the second subsea enclosure comprises a liquid tight barrier preventing a flow of liquid between an inside of the duct and the first subsea enclosure, the second subsea enclosure, or the first subsea enclosure and the second subsea enclosure, respectively.

* * * * *